July 12, 1932.   E. VENTRESCA   1,867,289
INSIDE CASING CUTTER
Filed March 13, 1931    2 Sheets-Sheet 1

Inventor
E. Ventresca
By Jesse R. Stone
& Lester B. Clark
Attorneys

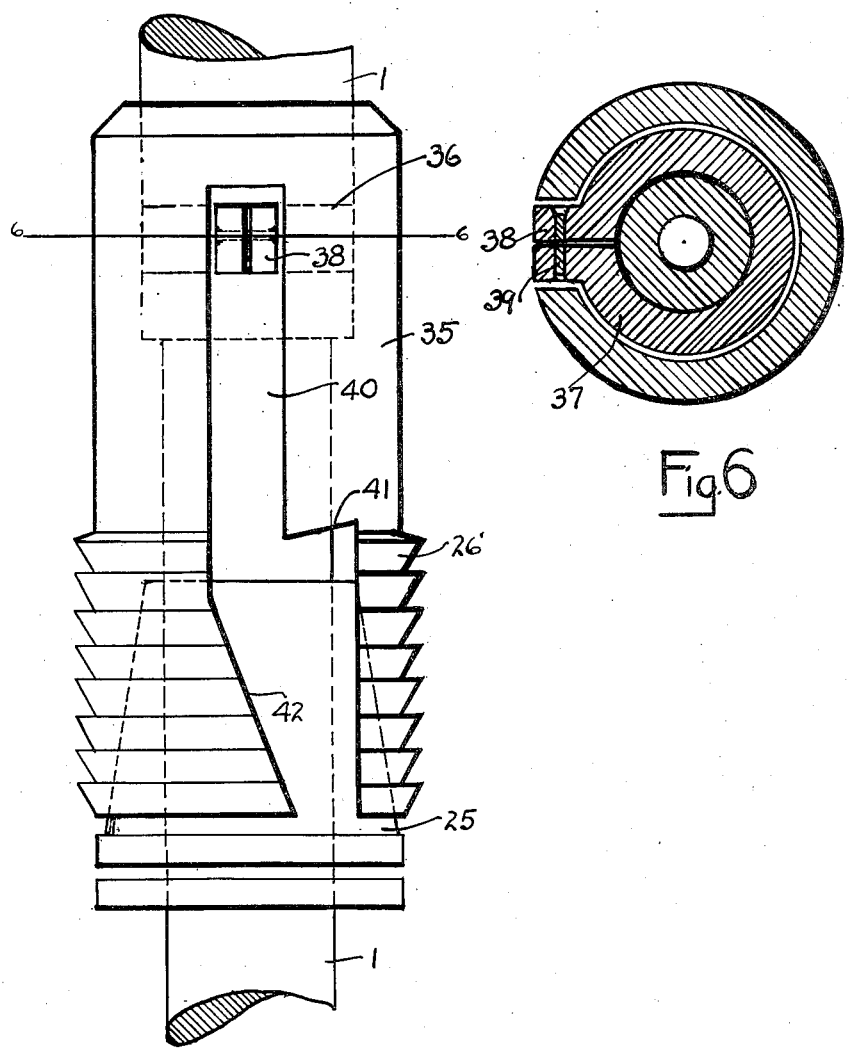

Patented July 12, 1932

1,867,289

UNITED STATES PATENT OFFICE

ERCOLE VENTRESCA, OF HOUSTON, TEXAS

INSIDE CASING CUTTER

Application filed March 13, 1931. Serial No. 522,274.

My invention relates to pipe cutters for use in cutting pipe in wells. It is particularly adapted for cutting casing, which has been set in the well, into sections so that it can be removed. It is adapted, however, for similar cutting operations upon any pipe lodged in a well.

It is an object of the invention to provide a pipe cutter which may be readily operated in cutting the pipe and which may be also employed in removing the pipe section which has been severed so that it may be withdrawn from the well.

It is a further object of the invention to provide a cutter with a pulling device connected therewith in which the pulling device may be released from the casing when it is found that it can not be moved.

It is another object to provide a pipe cutter in which the cutter may be maintained uniformly at one level in the well during the cutting operation and in which a uniform and resilient pressure is exerted upon the cutters.

The invention relates generally to the particular construction and arrangement of the parts making up my improved tool which structure will be more clearly understood from the drawings herewith wherein Fig. 1 is a central longitudinal section through a pipe cutter embodying my invention.

Fig. 5 is a broken side elevation of a pulling device which may be substituted for the one shown in Fig. 1.

Fig. 6 is a transverse section on the plane 6—6 of Fig. 5.

Figure 1:
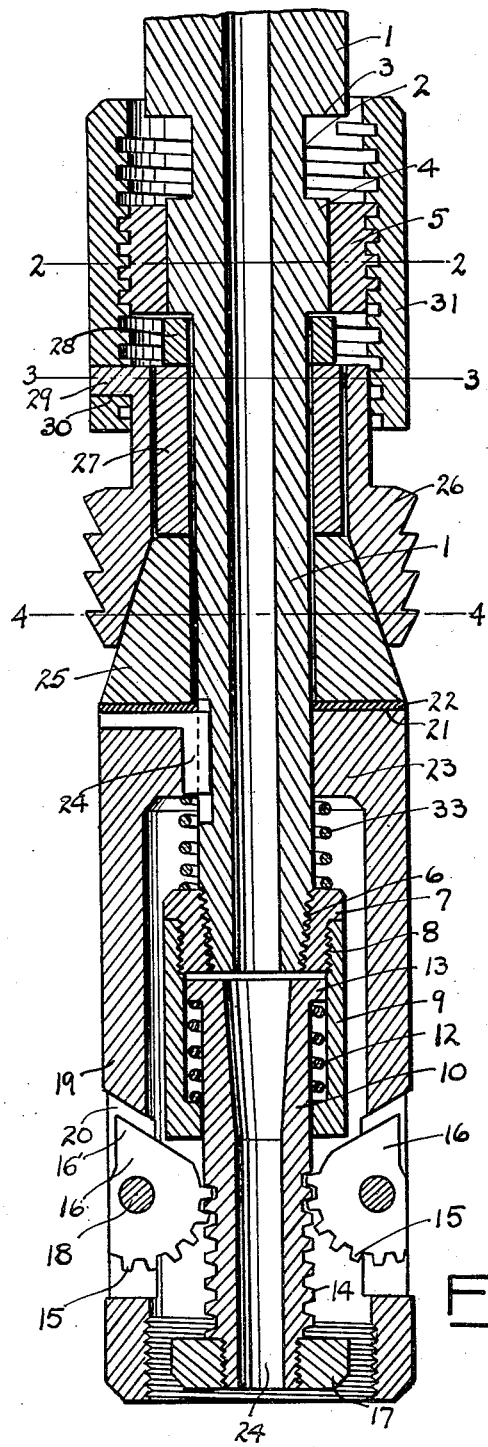
Figure 2:
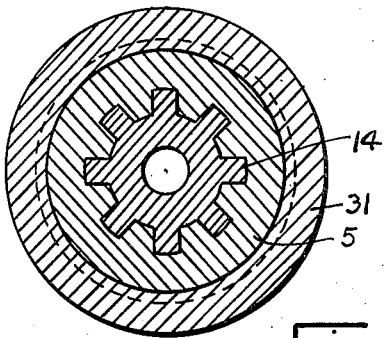
Fig. 2 is a transverse section on the plane 2—2 of Fig. 1.

My device is adapted to be connected at the lower end of a drive stem which is introduced into the well in sections so as to position the cutter at any desired depth in the well. The lower end of the drive stem is indicated at 1. At the upper end of the structure of the cutting device the diameter of the drive stem is reduced in diameter, as shown at 2, thus forming a shoulder 3 adjacent the upper end of the tool. Spaced downwardly from the shoulder the stem is formed with a plurality of radial teeth 4, shown best in Fig. 2. These teeth are adapted to engage within key-ways on the inner side of the nut 5, threaded oh its outer surface with a coarse flat crested thread as shown in Fig. 1.

Below the nut 5 the drive stem is of uniform cylindrical structure and extends downwardly for a suitable distance and is threaded at 6 at its lower end to engage within a bushing 7. Said bushing 7 has its lower end threaded at 8 externally to connect with a collar 9, which is intended to engage with the sliding mandrel 10. The lower end of the collar 9 has an inwardly extending flange 11, which engages with the outer surface of the mandrel 10 and forms a seat for a spring 12.

The mandrel 10 has an upper radial flange 13 against which the upper end of the spring 12 bears. The said spring therefore tends to form a resilient cushion between the flange 13 of the mandrel and the lower flange 11 on the collar. The lower end of the mandrel projects through the collar 9 and has its outer face cut with a plurality of rack teeth 14, which are positioned to engage with similar teeth 15 upon the pipe cutters 16. The lower end of the mandrel has thereon a head 17, forming a guide for the lower end thereof.

The cutters 16 are flattened plates having a pointed cutter portion 16' thereon at one end and opposite to the cutting end the body of the plate is formed on the arc of a circle and has the teeth 15 thereon previously referred to. The cutter plate is rotatable upon a pin 18 set in the body of the supporting head 19. It will be understood that the cutters 16 are fitted within slots 20 in the side of the head 19 and may be moved about the pivot 18 by the rack 14 so as to throw the cutting ends 16' into engagement with the pipe which is to be cut.

The head 19 upon which the cutters are mounted is a tubular structure having its upper end squared off at 21 to fit against an anti-friction washer 22. Said upper end has an inwardly extending flange 23 which engages closely about the stem 1. It is non-rotatable relative to the stem, however, through means of a key shown at 24 in dotted lines, which allows a longitudinal sliding movement of the head upon the stem but prevents relative rotation thereof.

Above the head 19 and normally resting on the anti-friction washer 22 is a frusto-conical shaped collar 25. Said collar fits slidably about the stem 1 and its outer surface forms a seat upon which the pipe-engaging dogs 26 may fit.

Above the collar 25 and separating the dogs 26 from the stem is a sleeve 27, which acts as a spacing means to space the member 25 from the ring 28, which bears against the lower ends of the keys 4 previously noted.

Figure 3:
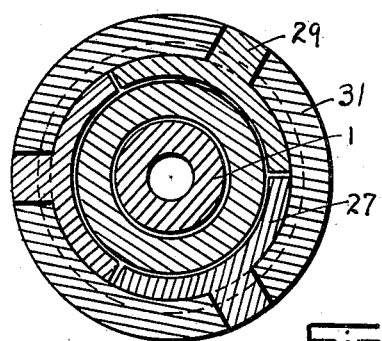
Fig. 3 is a similar section on the plane 3—3 of Fig. 1.
Figure 4:
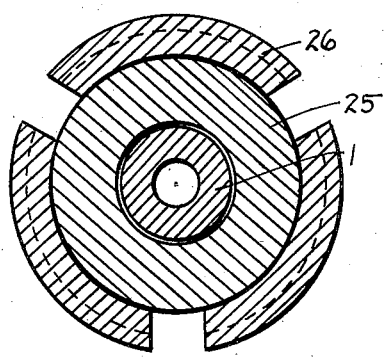
Fig. 4 is a similar transverse section on the plane 4—4 of Fig. 1.

The dogs 26 are toothed on their outer faces to engage within the pipe which is to be cut. The upper ends are extended above the dogs and have outwardly projecting arms 29 which engage within openings 30 adjacent the lower end of a threaded collar 31. As will be seen from Figs. 3 and 4, there are three of the pipe engaging dogs 26, the upper arms of which engage within the collar 31 and said dogs depend from the collar and are free to move radially in expanding and contracting relative to the pipe which is to be cut. The inner face of the sleeve 31 is threaded to engage with the nut 5 previously referred to.

In the operation of this device it will be seen that the tool can be assembled with the parts in the position shown in Fig. 1. When it is lowered into the well the jaws 26 are free to move upwardly relative to the expanding collar 25, the nut 5 being slidable upwardly on the keys 4. This will allow the dogs to move inwardly and not interfere with the lowering of the tool. When the proper depth has been reached an upward pull on the tool will engage the dogs 26 with the inner surface of the pipe to be cut and will cause the dogs 26 to move downwardly together with the sleeve 31 and the nut 5. When the dogs have generally gripped the casing a continued upwardly pull on the stem 1 will move the keys 4 upwardly out of engagement with the nut 5. It will also move the lower end of the stem upwardly against the action of the spring 33 above the bushing 7 and will compress the spring 12 against the mandrel 10 and thus pull the mandrel resiliently upwardly so as to throw the cutters into operative position.

When the cutters have engaged the pipe the stem will be anchored and the tension of the spring 12 will be sufficient thereafter to move the cutters firmly against the pipe until they have been advanced sufficiently to sever the pipe.

When the cutters have been moved into pipe-engaging position the stem 1 may be rotated to transmit a rotative motion to the cutters, carrying them around against the inner side of the pipe until they have completely penetrated the outer pipe and severed it. When this is done an upward pull upon the stem will move the severed portion upwardly so that it may be withdrawn from the well along with the cutting tool. If, however, it is found that the severed section of pipe is anchored and can not be withdrawn, the hold of the dogs 26 upon the pipe may be released. This is done by lowering the stem 1, allowing the keys 4 to move into the key-ways in the nut 5, and then rotating to screw the outer collar 31 upwardly along the nut and raise the cutting dogs upwardly away from the expanding collar 25 so that they will not engage the pipe. When thus released from the pipe the whole tool may be withdrawn. It will be seen that if the dogs 26 are firmly engaged with the pipe the downward movement of the stem 1 will bring the lower ends of the keys 4 against the ring 28 and a thrust may thus be exerted against the ring and the spacing collar 27 to drive the expanding collar 25 downwardly from beneath the jaws so that they may be released from their hold on the pipe. During the operation of the device a circulation of fluid may be maintained downwardly through the passage 34 in the stem and mandrel as is sometimes desirable.

In Figs. 5 and 6 I have shown a substitute for the pipe pulling device previously described. The dogs 26 in this case are suspended upon an upper sleeve 35, which fits about the lower end of the stem 1. Said stem 1 is recessed to provide an annular opening 36 therein, into which may be fitted a ring 37. As seen in Fig. 6, this ring 37 is a split ring having its meeting ends extended outwardly to form flanges 38 through which a pin 39 may be extended to rivet the two ends together, after said ring has been fitted within the annular recess 36 in the stem. The two extending flanges 38 of the ring project through a longitudinally slotted opening 40 in the upper sleeve 35, to which the dogs are connected. Said slot 40 is of sufficient width to allow the collar to slide upwardly along the stem 1 to bring the projecting flanges 38 downwardly in said slot to engage below a shoulder 41 formed at the lower end of said slot. The side of the slot opposite the shoulder 41 is inclined laterally at 42 so as to move the flanges 38 upon the ring to the right, as seen in Fig. 5, so as to bring the said flanges 38 under the shoulder 41. Thus when these dogs are to be released the stem will be thrust downwardly bringing the flanges 38 against the shoulder 42 and rotating the ring slightly to bring the flanges into line below the shoulder 41. After the stem is then drawn upwardly it will engage the shoulder 41 and move the dogs upwardly with the stem out of engagement with the expanding collar 25 as will be obvious.

I contemplate the use of a releasable pulling device with my cutter and as will be noted either of these two structures may be employed, the advantage of the pulling device shown in Fig. 5 being that no rotation of the stem is necessary to disengage the pulling dogs from the pipe.

Having described my invention what I claim is:

1. A cutting and pulling device for pipe in wells comprising a stem, a slidably mounted cutter body nonrotatable on said stem, cutters mounted to oscillate in said body, a cutter rotating rack resiliently connected with said stem, a dog expanding collar above said body, dogs thereon, a sleeve supporting said dogs and means engaging said sleeve and responsive to a rotation of said stem to lift said dogs, said stem being rotatable independently of said dogs.

2. A cutting and pulling device for pipe in wells comprising a stem, a slidably mounted cutter body nonrotatable on said stem, cutters mounted to oscillate in said body, a cutter rotating rack resiliently connected with said stem, a dog expanding collar above said body, dogs thereon, a sleeve supporting said dogs and a nut slidable on said stem but having a threaded engagement with said sleeve whereby rotation of said nut will move said sleeve.

3. A cutting and pulling device for pipe in wells comprising a stem, a cutter head rotatable with said stem but having a limited sliding movement thereon, cutters pivoted in said head to rotate to and from extended position, a rack yieldably connected with said stem to engage and rotate said cutters in said head, an expanding sleeve above said head, dogs adapted to seat on said sleeve, and means to move said dogs to or from pipe engaging position along said sleeve.

4. A cutting and pulling device for pipe in wells comprising a stem, a cutter head rotatable with said stem but having a limited sliding movement thereon, cutters pivoted in said head to rotate to and from extended position, a rack yieldingly connected with said stem to engage and rotate said cutters in said head, an expanding sleeve above said head, dogs adapted to seat on said sleeve, a supporting sleeve for said dogs, a nut on said stem engaging said sleeve whereby said sleeve may be moved upwardly to carry said dogs to contracted position responsive to the rotation of said stem.

5. A pipe cutter including a stem, a rack member having a yieldable connection with the lower end of said stem, a cutter head slidable nonrotatably on said stem, cutters mounted in said head, teeth on said cutters engaging said rack and means to anchor said head to the pipe to be cut, said yieldable connection acting when said stem is held stationary to move said cutters against the pipe to which the head is anchored, said stem being rotatable relative to said anchoring means.

6. A pipe cutter including a stem, a collar fixed to the lower end thereof, a mandrel slidable in said collar, a spring on said collar supporting said mandrel, a cutter head on said stem and rotatable therewith but having a yielding longitudinal support thereon, cutters on said head, rack teeth on said cutters, a rack on said mandrel engaging said teeth to move said cutters to and from cutting position, and means to anchor said head, whereby the relative upward movement of said stem will yieldably force said cutters outwardly.

7. A pipe cutter including a stem, a mandrel axially aligned with said stem, yieldable means connecting said stem and mandrel, a cutter head on said stem, cutters pivoted on said head, means on said mandrel to actuate said cutters, means to anchor said head to the pipe to be cut, the upward movement of said stem relative to said anchoring means serving to advance said cutters.

In testimony whereof I hereunto affix my signature this 28th day of February, A. D. 1931.

ERCOLE VENTRESCA.